United States Patent
Kondo

(10) Patent No.: US 7,605,945 B2
(45) Date of Patent: Oct. 20, 2009

(54) COLOR REPRODUCTION DEFINITION CREATING METHOD AND COLOR CONVERSION METHOD

(75) Inventor: Hirokazu Kondo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 746 days.

(21) Appl. No.: 11/084,124

(22) Filed: Mar. 21, 2005

(65) Prior Publication Data

US 2005/0219584 A1    Oct. 6, 2005

(30) Foreign Application Priority Data

Mar. 31, 2004    (JP)    ............................. 2004-104848

(51) Int. Cl.
*G06F 15/00* (2006.01)
(52) U.S. Cl. .................... 358/1.9; 358/504; 358/518; 382/162; 382/167; 345/604
(58) Field of Classification Search .............. 358/1.9, 358/518, 504; 382/167, 162; 345/604
See application file for complete search history.

(56) References Cited

U.S. PATENT DOCUMENTS

| | | | |
|---|---|---|---|
| 6,262,810 B1 * | 7/2001 | Bloomer ..................... | 358/1.9 |
| 6,755,498 B2 * | 6/2004 | Revie et al. .................. | 347/15 |
| 2001/0038468 A1 * | 11/2001 | Hiramatsu .................. | 358/518 |

FOREIGN PATENT DOCUMENTS

| | | | |
|---|---|---|---|
| EP | 581590 A2 * | 2/1994 | |
| EP | 1 102 478 A2 | 5/2001 | |
| JP | 01-165441 A | 6/1989 | |
| JP | 2001-103329 | 4/2001 | |
| JP | 2001-103329 A | 4/2001 | |
| JP | 2002-252785 | 9/2002 | |
| JP | 2002-252785 A | 9/2002 | |
| JP | 2004-048588 A | 2/2004 | |

OTHER PUBLICATIONS

Philip Galanter, Recent Developments in Color Management, Arts Technology Connect, Spring 1998, p. 4.*
M. Mahy, "Calculation of Color Gamuts Based on the Neugebauer Model," Color Research and Application, vol. 22, No. 6; Dec. 1997, John Wiley & Sons.
Japanese Office Action in Application JP 2004-104848.

* cited by examiner

*Primary Examiner*—King Y Poon
*Assistant Examiner*—Jamares Washington
(74) *Attorney, Agent, or Firm*—Sughrue Mion, PLLC

(57) ABSTRACT

The present invention selects color materials for a virtual device from real color materials, adjusts a gray balance to obtain a predetermined black color at a maximum device value by using selected color materials, assigns a color material amount to each device value so that a relation between the device value and brightness becomes linear when outputting gray, and evaluates a color range reproducible by the virtual device with the assigned color material amount by an inclusion rate for a standard color group so as to start the process all over again from selection of the color materials if evaluation is poor. It thus obtains the color reproduction definition of the virtual device and performs the color conversion including gamut mapping using the color reproduction definition.

6 Claims, 12 Drawing Sheets

COLOR REPRODUCTION DEFINITION CREATING METHOD AND COLOR CONVERSION METHOD

BACKGROUND OF THE INVENTION

1. Field of the Invention

The present invention relates to a color reproduction definition creating method of creating a color reproduction definition representing a correspondence between a device value and an output color in a device outputting an image on a medium with a color material of each color of an amount according to the device value of each of multiple colors, and a color conversion method of converting the device values among multiple devices.

2. Description of the Related Art

Various types of input devices for inputting an image to obtain image data are known, such as a color scanner for reading a recorded image and obtaining the image data and a DSC (Digital Still Camera) for focusing the image of a subject on a solid-state image sensing device and reading it to obtain the image data. As for these input devices, the image data is represented by device values in a fixed range such as a range including 0 to 255' for each of three colors of R (Red), G (Green) and B (Blue) for instance. As for the three colors of R, G and B, the colors representable by the device values in the fixed range are limited respectively. For this reason, once converted to the image data by using the input device, the image represented by the image data is limited to the colors in a color area equivalent to the range in a color space of R, G and B even if the colors of an original image has very rich representation.

As for output devices for outputting the image based on the image data, various types are known, such as a photo printer for exposing a photographic paper with a laser beam and developing it to record the image thereon, a printer for recording the image on paper by an electrophotographic method or an inkjet method, a printing machine for creating a large amount of printed matter by rotating a rotary press, and a light-emitting display device such as a CRT display or a plasma display for emitting light on a display screen based on the image data and displaying the image. These output devices also have the respective color representation areas as with the input devices. To be more specific, the output devices can represent various colors based on the image data representing the three colors of R, G and B and the image data representing four colors of C (Cyan), M (Magenta), Y (Yellow) and K (Black). However, the representable colors are limited to those within the color areas in which the output device color spaces (such as an RGB space and a CMYK space) exist (within the color areas represented by the device values in the range of 0 to 255 as to each of R, G and B for instance).

Such color areas representable by the input devices and output devices are called color reproduction areas (color gamut). The correspondence between the device values (co-ordinate values of device color spaces) and the colors in color reproduction areas which is represented by an LUT (Look UP Table) and so on is called a color reproduction definition (color profile).

In recent years, the cases of mutually converting the image data among various input devices and output devices are increasing, and there is a known isochromatic method of using the color reproduction definition to keep the colors of the image isochromatic on converting the image data. As described above, however, the color reproduction areas (color gamut) are different according to the devices. Therefore, there are the cases where, if the image data is converted by the method of merely keeping the colors of the image isochromatic, there arises lack of color representation in a portion where the color reproduction areas are mismatched so that the image represented by the converted image data becomes an unnatural image.

It is also empirically known that the images which are originally the same in spite of different color reproduction areas are representable as natural images to the human eye by each of various devices. The natural images represented by such various devices are represented mutually in a little different colors according to differences in their color reproduction areas. As the human eye is highly adaptive, the images give a natural impression whichever device they may be represented by.

Thus, there is a need for the color conversion for converting the colors of the image to keep the natural impression of the image on converting the image data. It is desirable that such color conversion is the one for associating the colors in the color reproduction area (color gamut) of a certain device with those in the color reproduction area (color gamut) of another device in just proportion. This color conversion is called gamut mapping.

Here, the case of converting the image data from one input device to multiple models of output devices is assumed for instance.

In this case, assuming that the color conversion (gamut mapping) from the color reproduction area (color gamut) of the input device as a conversion source to the color reproduction area (color gamut) of each output device as a conversion destination is individually performed, there arises a problem that the impressions of the images outputted by the multiple output devices are mutually different. Thus, there is a proposed color conversion method of creating a virtual common color reproduction area including the respective color reproduction areas of the multiple models of output devices and undergoing the color conversion from the color reproduction area of the input device to the common color reproduction area and the color conversion from the common color reproduction area to the color reproduction area of each output device (refer to Japanese Patent Laid-Open No. 2002-252785 for instance). It is expected that, by adopting such a color conversion method, the impressions of the images after the color conversion match up among the multiple devices as the conversion destinations that each have been color-converted from the device as a common color conversion source respectively.

In the case where the image data is converted as described above, the method of the color representation of the input device is often different from that of the output device, such as the color representation in the three colors of R, G and B and that in the three colors of C, M and Y for instance. And forms of the color reproduction area are significantly different between the devices of different color representation methods. If the color conversion of a general method is performed between the color reproduction areas in significantly different forms, there often arises discontinuity such as missing and crushing of tones which becomes a cause of image quality degradation. Thus, there is a proposed color conversion method whereby a change direction of the color in the color conversion (gamut mapping) is decided in the device color space so as to maintain continuity of the tones on the color conversion (refer to Japanese Patent Laid-Open No. 2001-103329 for instance).

It is thinkable, at first glance, that a combination of the color conversion described in Japanese Patent Laid-Open No. 2002-252785 and the color conversion described in Japanese Patent Laid-Open No. 2001-103329 allows the color conversion capable of maintaining the continuity of tones and causing the impressions of the images among the devices as the conversion destinations to match up.

To combine the color conversion described in Japanese Patent Laid-Open No. 2002-252785 with the color conversion described in Japanese Patent Laid-Open No. 2001-103329, however, there must exist a color reproduction definition representing a correspondence between colors in the common color reproduction area and device values. As the common color reproduction area is virtually created to include color reproduction areas of the respective devices of multiple models, there is no definition as to the correspondence to device color spaces.

As for the common color reproduction area itself, it cannot be infinitely large just because it includes the color reproduction areas of the respective multiple devices. Unless the common color reproduction area has the adequate largeness and form, it eventually causes discontinuity of tones and so on.

SUMMARY OF THE INVENTION

The present invention has been made in view of the above circumstances and provides a color reproduction definition creating method of creating a color reproduction definition of a virtual output device having adequate largeness and form preferred as a common color reproduction area, and a color conversion method capable of maintaining continuity of tones and causing impressions among multiple devices as color conversion destinations to match up.

The color reproduction definition creating method of the present invention is the one that creates a color reproduction definition representing a correspondence between a device value and an output color of a hypothetical virtual device outputting an image on a medium with a color material of each color according to the device value of each of colors, the method including:

a selection step of selecting candidates of color materials in colors to be used on the virtual device from real color materials;

a gray balance adjustment step of associating a color material amount of each color with a maximum value of the device value of each color when the virtual device outputs a predetermined black color by using the color materials in the colors selected in the selection step;

a device value association step of associating each color material amount with each device value so that a relation between brightness and the device value becomes a linear relation when the virtual device outputs achromatic colors of different brightness; and an evaluation step of evaluating broadness of a color range reproducible by the virtual device by an inclusion rate of standard colors and according to an evaluation result, having the steps started all over again from the selection process.

Here, the "linear relation" is not limited to a line shape in a strict sense, but may be a substantially or practically linear relation.

According to the color reproduction definition creating method of the present invention, it is possible to obtain the color reproduction definition of the virtual device having ideal gray balance and gray tones and also having a color representation area of the adequate largeness and form as the common color reproduction area for a real output device.

Another color conversion method of the present invention is the one including:

a first color representation conversion which converts a device value of a real first device mediating between a color of an image and the device value to a color value having the color mediated by the first device represented by a color system nondependent on the device;

a first color area conversion which converts each color in a color range reproducible by the first device to each color in a color range reproducible by a hypothetical virtual device outputting the image on a medium with a color material of each color of an amount according to the device value of each of a plurality of colors, based on a correspondence between a device value and an output color of the virtual device, the correspondence being obtained by selecting candidates of color materials in the plurality of colors to be used on the virtual device from real color materials, associating a color material amount of each color with a maximum value of the device value of each color when the virtual device outputs a predetermined black color by using the selected color materials in the plurality of colors, associating each color material amount with each device value so that a relation between brightness and the device value becomes a linear relation when the virtual device outputs achromatic colors of different brightness, and evaluating broadness of a color range reproducible by the virtual device by an inclusion rate of a plurality of standard colors and having the process started all over again from the selection of the color materials according to an evaluation result;

a second color area conversion which converts each color in the color range reproducible by the virtual device to each color in the color range reproducible by a real second device outputting the image on the medium with the color material of each color according to the device value of each of a plurality of colors of the same kinds as the plurality of colors; and a second color representation conversion which converts, to the device value of the second device, the color value of the color to be reproduced by the second device represented by the color system nondependent on the device.

According to this color conversion method of the present invention, it is possible, by color conversion via the common color reproduction area having the adequate largeness and form and associated with ideal device values, to maintain the continuity of tones and cause the impressions among the multiple devices as the conversion destinations to match up.

The above another color conversion method of the present invention has a preferred form wherein:

"the first color representation conversion and the first color area conversion are defined as a combined transformation by a first combined transformation definition having associated the device value of the first device with each color in the color range reproducible by the virtual device; and the second color area conversion and the second color representation conversion are defined as a combined transformation by a second combined transformation definition having associated each color in the color range reproducible by the virtual device with the device value of the second device."

According to this preferred form, it is possible to easily implement the color conversion of the present invention just by replacing the first combined transformation definition and the second combined transformation definition with the color reproduction definition of a conventional isochromatic conversion method.

As described above, it is possible, according to the color reproduction definition creating method of the present invention, to obtain the color reproduction definition of the virtual output device having the adequate largeness and form suitable as the common color reproduction area. Moreover, according to the color conversion method of the present invention, it is possible, based on the color reproduction definition of such a virtual output device, to implement the color conversion capable of maintaining the continuity of tones and causing the impressions among the multiple devices as the color conversion destinations to match up.

DETAILED DESCRIPTION OF THE INVENTION

Figure 1:
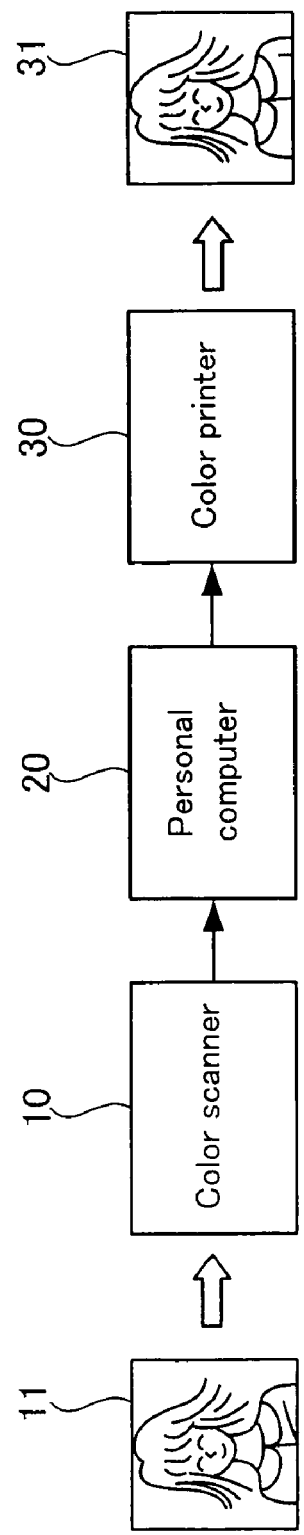
FIG. 1 is an overall block diagram of an image input—color conversion—image output system to which an embodiment of the present invention is applied.

Hereunder, an embodiment of the present invention will be described by referring to the drawings.

FIG. 1 is an overall block diagram of an image input—color conversion—image output system to which an embodiment of the present invention is applied.

Here, a color scanner 10 as an example of a first device according to the present invention is shown. The color scanner 10 reads an original image 11 recorded on a color reversal film so as to generate image data representing colors of the image with device values of three colors of RGB respectively. This RGB image data is inputted to a personal computer 20. The personal computer 20 converts the image data obtained by the color scanner 10 to the image data for image output of which colors are represented by the respective device values of three colors of CMY suited to a color printer 30 as an example of a second device according to the present invention. The image data for image output is inputted to the color printer 30, where print output is performed with an amount of a color material according to the device values of the inputted image data so as to form a print image 31.

Here, the personal computer 20 functions as a color conversion apparatus. When converting the image data obtained by the color scanner 10 to the image data for the color printer 30, the personal computer 20 converts the device values by referring to a color conversion definition created and stored in advance. This color conversion definition will be described later.

A system shown in FIG. 1 indicates the color printer 30 as an example of an output device for outputting the image based on the image data. The color printer 30 may be any of the color printer of an electrophotographic method, that of an inkjet method and the printer of a method of exposing a photographic paper with a modulated laser beam and developing it. And it does not matter whatever print method is taken as long as it is the one for producing an output with the amount of the color material according to the device values. The output device is not limited to the printer but may also be a printing machine.

The following description will be given based on the system shown in FIG. 1, and so elements shown in FIG. 1 will be referred to by using the reference characters without indicating the drawing number.

Here, a description will be given as to a basic concept of the color conversion definition referred to inside the personal computer 20 and basic conversion of the device values performed by referring to the color conversion definition.

The color conversion definition referred to by the personal computer 20 defines a correspondence between the device values (RGB values) for the color scanner 10 and the device values (CMY values) for the color printer 30. A basic color conversion definition is created by combining the color reproduction definition (input profile) representing the relation between the device values and the colors of the color scanner 10 with the color reproduction definition (output profile) representing the relation between the device values and the colors of the color printer 30.

As for these color reproduction definitions (input profile and output profile), the colors reproduced by the devices are objectively represented by coordinates of color spaces nondependent on the devices. There are known color spaces nondependent on the devices, such as an L*a*b* color space, an XYZ color space, an LCH color space and an L*u*v* color space. This embodiment adopts the L*a*b* color space as the color space nondependent on the devices.

Figure 2:
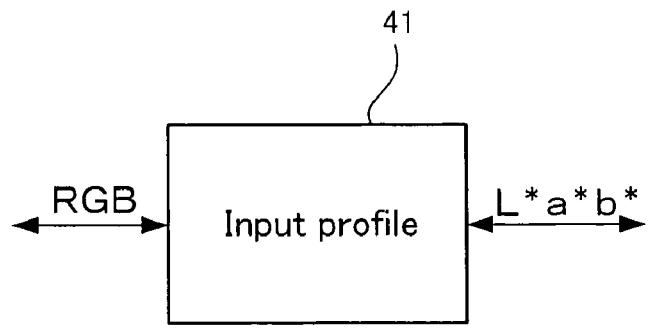
FIG. 2 is a conceptual diagram of an input profile.

FIG. 2 is a conceptual diagram of the input profile.

An input profile 41 is generally obtained from a color scanner manufacturer. This input profile 41 has the correspondence between coordinate points on an RGB space (RGB values) and coordinate points on the L*a*b* color space (Lab values) defined in an LUT (Look UP Table) form. The input profile 41 has forward conversion from the RGB space to the L*a*b* color space and backward conversion from the L*a*b* color space to the RGB space defined respectively, and a mutual correspondence between the RGB space and the L*a*b* color space is thereby defined.

The input profile 41 is a profile dependent on an input device which is different according to a kind of the color scanner and more generally the kind of input device.

Figure 3:
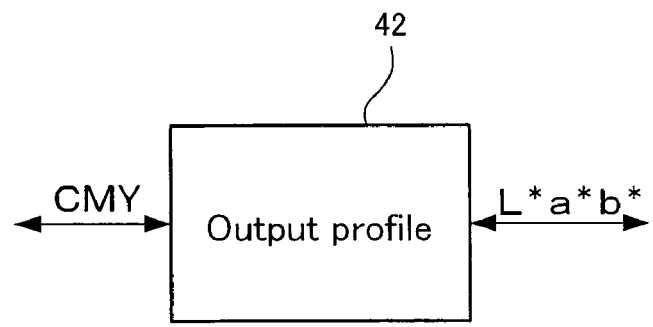
FIG. 3 is a conceptual diagram of an output profile.

FIG. 3 is a conceptual diagram of the output profile.

An output profile 42 corresponding to the color printer is also obtained from a color printer manufacturer thereof in many cases. The output profile 42 has the correspondence between coordinate points on a CMY space (CMY values) and coordinate points on the L*a*b* color space (Lab values) defined in the LUT form. As with the input profile, the output profile 42 has the forward conversion from the CMY space to the L*a*b* color space and the backward conversion from the L*a*b* color space to the CMY space defined respectively, and the mutual correspondence between the CMY space and the L*a*b* color space is thereby defined.

The output profile 42 is the profile dependent on the output device, which is different according to the output device.

Figure 4:
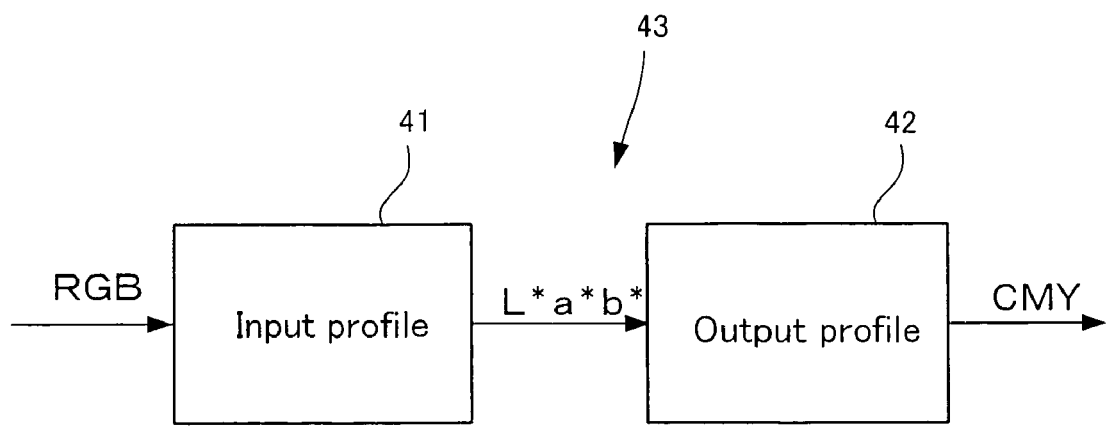
FIG. 4 is a conceptual diagram of a color conversion definition consisting of a combination of the input profile and output profile.

FIG. 4 is a conceptual diagram of the color conversion definition consisting of the combination of the input profile and the output profile.

A color conversion definition 43 is created by having the input profile 41 and output profile 42 combined by the personal computer 20. The color conversion definition 43 shown here defines the conversion of the device values from the RGB space to the CMY space, and it is the combination of the forward conversion in the input profile 41 and backward conversion in the output profile 42. In the case of a basic combination, the Lab value which is an output value of the forward conversion is used as-is as an input value of the backward conversion. If basic conversion of the device values according to the basic color conversion definition 43 obtained by combining the forward conversion and backward conversion is performed by a function of the personal computer 20 as a color conversion apparatus, the print image 31 having the colors of the original image 11 reproduced as-is thereon can be obtained on the color printer 30.

Figure 5:
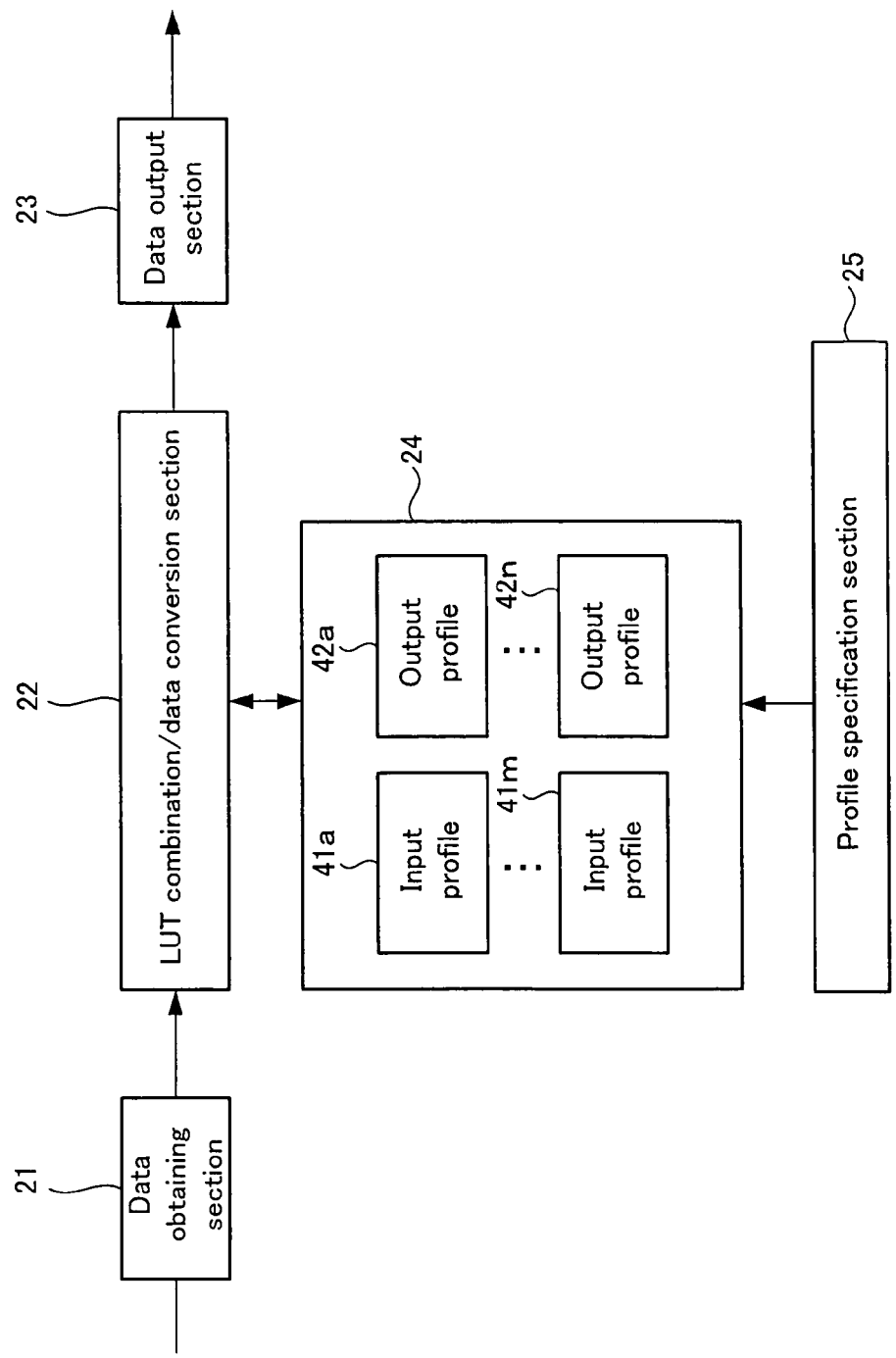
FIG. 5 is a functional block diagram representing functions of a personal computer 20 as a color conversion apparatus.

FIG. 5 is a functional block diagram representing the functions of the personal computer 20 as the color conversion apparatus.

As shown in FIG. 5, the color conversion apparatus consists of a data obtaining section 21, an LUT combination data conversion section 22, a data output section 23, a profile storage section 24 and a profile specification section 25.

The data obtaining section 21 obtains the image data from the color scanner 10. The data output section 23 outputs the image data to the color printer 30.

The LUT combination data conversion section 22 creates the color conversion definition by combining the input profile and output profile as described in FIG. 4, and converts the device values according to the color conversion definition.

The profile storage section 24 has multiple input profiles 41a, ..., 41m corresponding to multiple input devices respectively and multiple output profiles 42a, ..., 42n corresponding to multiple output devices respectively stored therein.

The profile specification section 25 specifies according to an operation by an operator the input profile and output profile to be combined by the LUT combination data conversion section 22 out of the multiple input profiles 41a, ..., 41m and multiple output profiles 42a, ..., 42n stored in the profile storage section 24.

Such a color conversion apparatus creates the color conversion definition and converts the device values.

As for the basic conversion according to the basic color conversion definition, there is a problem, as described below, that the color reproduction area (color gamut) of the color scanner 10 do not generally match with the color reproduction area (color gamut) of the color printer 30.

Figure 6:
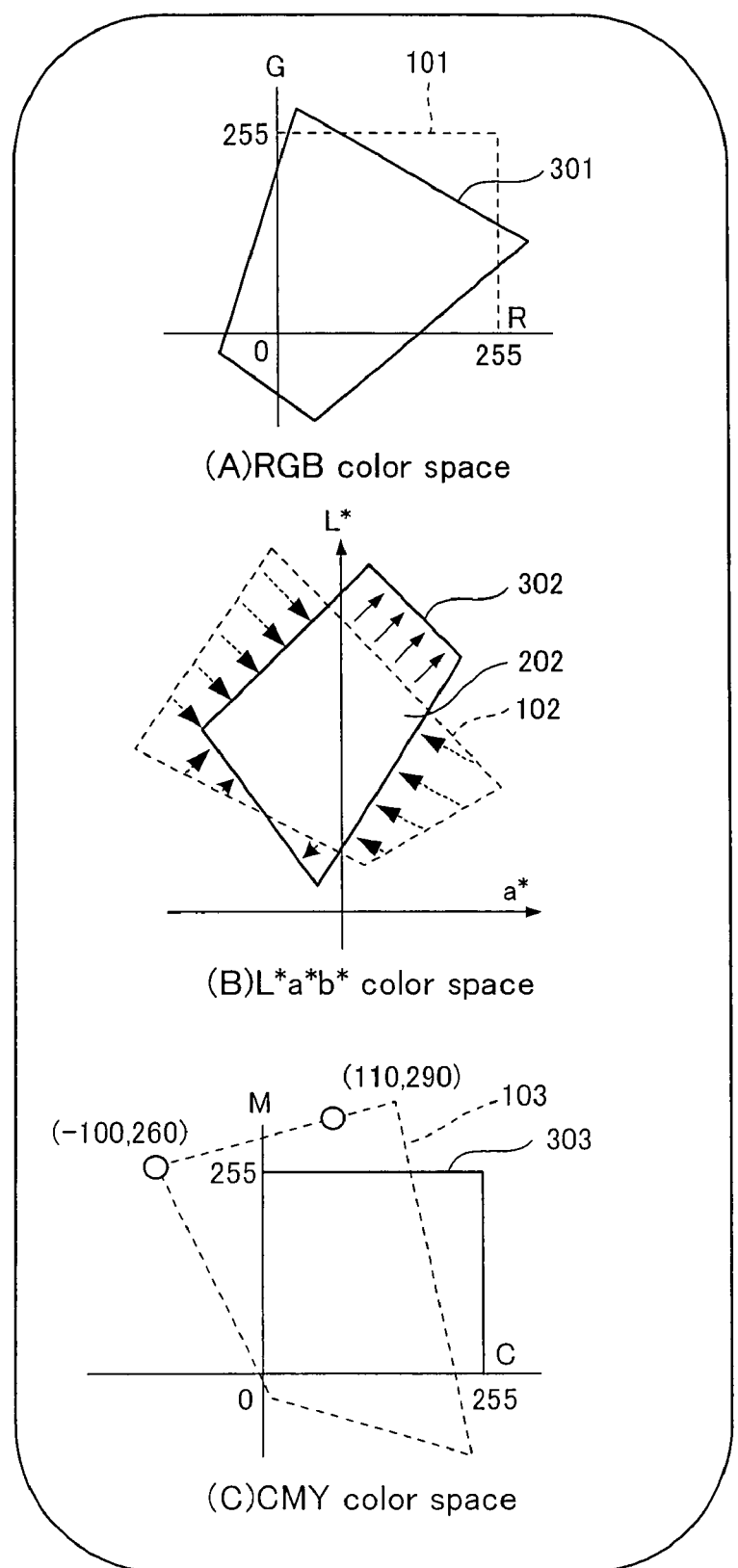
FIG. 6 is a pattern diagram of color reproduction areas of a color scanner 10 and a color printer 30.

FIG. 6 is a pattern diagram of the color reproduction areas of the color scanner 10 and color printer 30.

Part (A) of FIG. 6 represents the RGB space which is the color space for the input device. An R-G plane is shown in Part (A) of FIG. 6 to simplify illustration. Part (B) and part (C) of FIG. 6 are the same, where part (B) of FIG. 6 shows an L*-a* plane of the L*a*b* space as one of the spaces nondependent on the device and part (C) of FIG. 6 shows an C-M plane of the CMY space as the color space for the output device.

The color scanner 10 converts the original image 11 to the image data representing numeric values of 0 to 255 as to each of R, G and B. In this case, a rectangular area shown in part (A) of FIG. 6 is a color reproduction area 101 of the color scanner 10.

Here, if the input profile described by referring to FIG. 2 is used to map the color reproduction area 101 of the color scanner 10 shown in part (A) of FIG. 6 to the L*a*b* space, a mapped color reproduction area 102 thereof becomes the area as shown in dotted line in part (B) of FIG. 6. If the output profile described by referring to FIG. 3 is further used to map the color reproduction area 102 to the CMY space for the output device, a color reproduction area 103 of the color scanner 10 becomes the area as shown in dotted line in part (C) of FIG. 6.

As opposed to it, a color reproduction area 303 of the color printer 30 is a cubic area (rectangular area on the C-M plane in part (C) of FIG. 6) in which C, M and Y are indicated in a numeric range of 0 to 255 on the CMY space in part (C) of FIG. 6. For this reason, there are the cases where, if the original image 11 is read by the color scanner 10 and converted to the image data on the RGB space, which is then converted to the image data on the CMY space by way of the L*a*b* space, it may be converted to the device value exceeding a color range representable by the color printer 30 (device values of 0 to 255 for R, G and B). For instance, the device values exemplified in part (C) of FIG. 6 such as (C, M)=(110, 290) and (C, M)=(−100, 260) apply to this case.

If the color reproduction area 303 of the color printer 30 shown in the rectangular area of 0 to 255 in part (C) of FIG. 6 is mapped to the L*a*b* space by using the output profile, it is represented as an area 302 shown in part (B) of FIG. 6.

Furthermore, if the color reproduction area 302 of the color printer 30 mapped to the L*a*b* space in part (B) of FIG. 6 is further mapped to an input RGB space in part (A) of FIG. 6, it is represented as an area 301 in 'irregular square' shape which is partially getting out of the rectangular area 101 as the color reproduction area of the color scanner 10.

If the color reproduction area of the color scanner 10 is different from that of the color printer 30, there is a problem that there exist the colors that can be captured by the color scanner 10 but cannot be outputted by the color printer 30. For this reason, there is a need for the color conversion (gamut mapping) for replacing the colors representable by the color scanner 10 with the colors in the range representable by the color printer 30.

As for the simplest gamut mapping, clipping is performed so that the image data representing the colors out of the color reproduction area of the color printer 30 becomes the image data located on a boundary of the color reproduction area of the color printer 30. To be more specific, (C, M)=(110, 290) is changed to (C, M)=(110, 255) and (C, M)=(−100, 260) is changed to (C, M)=(0, 255). This gamut mapping is a kind of gamut mapping in a device color space. In the case of the gamut mapping, a defect occurs to the image by crushing the tones when the colors represented in the original image are the colors outside the color reproduction area of the color printer 30.

There are some techniques conventionally proposed as to the color conversion (gamut mapping) for converting the colors in the color reproduction area 102 of the color scanner 10 (input device) to the colors in the color reproduction area 302 of the color printer 30 (output device) in a common color space represented by the L*a*b* space.

As for the color conversion (gamut mapping) in the L*a*b* space, in the case of broadly using the color reproduction area representable by the color printer 30, what is generally performed is both "compression" for mapping the data out of an overlapping area 202 of the color reproduction area 101 of the color scanner 10 and the color reproduction area 302 of the color printer 30 to the inside of the overlapping area 202 as indicated by an arrow in broken line in part (B) of FIG. 6 and "extension" for extending the data inside the overlapping area 202 to the outside thereof while keeping the condition of being inside the color reproduction area 302 of the color printer 30 as indicated by the arrow in full line in part (B) of FIG. 6.

According to such gamut mapping in the L*a*b* space, it is possible to alleviate the crushing of the tones to an extent.

However, in the case of converting the image data from a common input device to multiple output devices, there is a strong possibility that impressions of the image become mutually different among the multiple output devices.

Thus, there is proposed the above-described gamut mapping of the method of going through a virtual common color reproduction area including the respective color reproduction areas of the multiple output devices.

Figure 7:
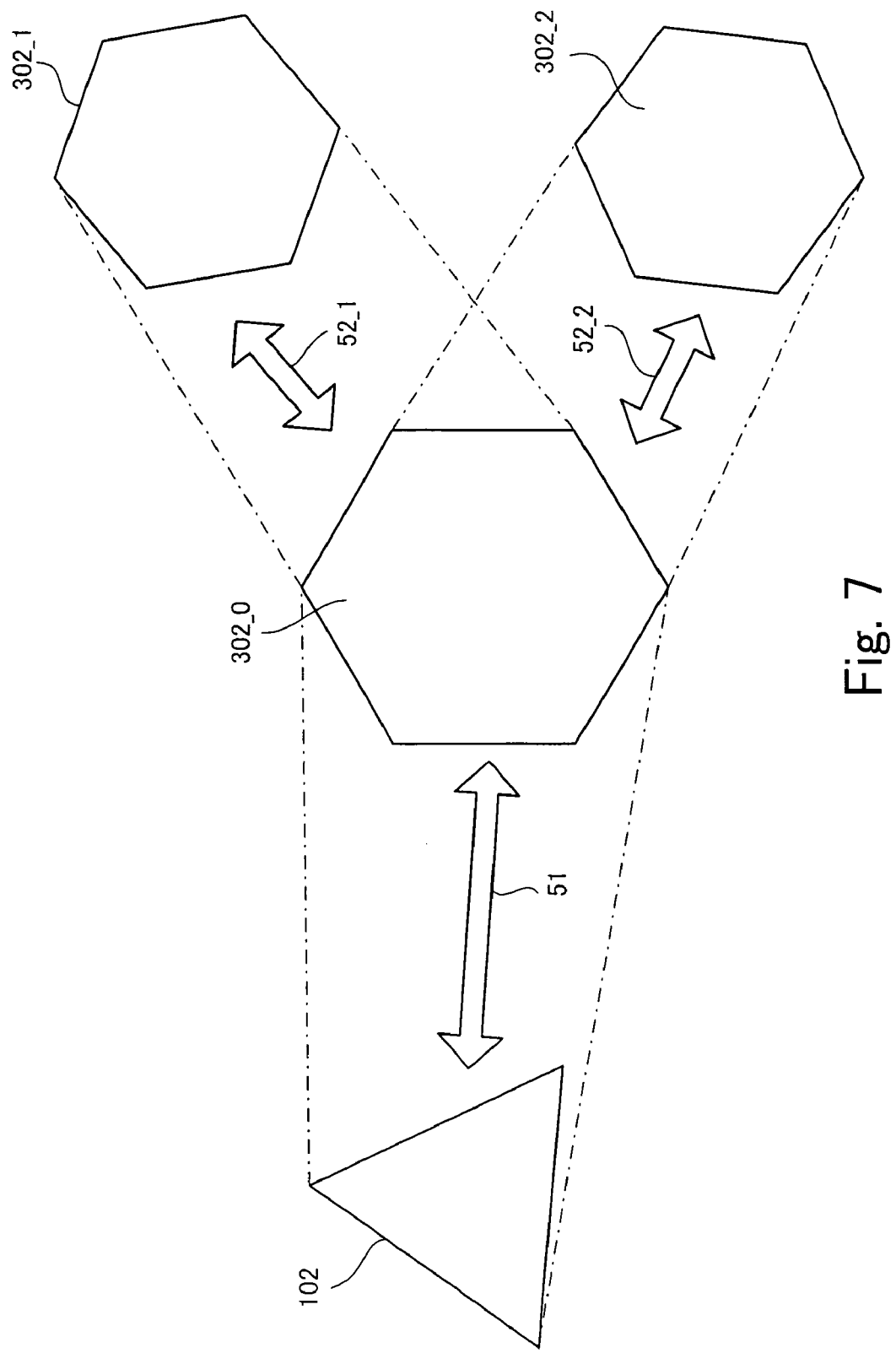
FIG. 7 is a conceptual diagram representing the color conversion (gamut mapping) of a method of going through a common color reproduction area.

FIG. 7 is a conceptual diagram representing the color conversion (gamut mapping) of the method of going through the common color reproduction area.

FIG. 7 shows the color reproduction areas on the L*a*b* space.

A common color reproduction area 302_0 is created by expanding and deforming forms of color reproduction areas 302_1 and 302_2 so as to include the color reproduction areas 302_1 and 302_2 of the respective output devices. The color conversion from the color reproduction area 102 of the input device to the color reproduction areas 302_1 and 302_2 of the respective output devices is the combination of a foregoing portion 51 from the color reproduction area 102 to the common color reproduction area 302_0 and subsequent portions 52_1 and 52_2 from the common color reproduction area 302_0 to the color reproduction areas 302_1 and 302_2 of the output devices. Consequently, the conversion becomes mutually similar in the subsequent portions 52_1 and 52_2, where the impressions of the image of the output devices match up mutually.

Between the devices of different types of device values (such as RGB and CMY) such as the color scanner 10 and color printer 30, however, there are many cases where the largeness and form of the color reproduction areas are significantly different. Therefore, the largeness and form of the color reproduction area 102 and the common color reproduction area 302_0 may also be significantly different. In that case, discontinuity of the tones arises due to the conversion in the foregoing portion 51, which causes image degradation. Even if there is continuous conversion on the L*a*b* space, the discontinuity arises on the device color space finally reached.

Such discontinuity becomes problematic in the case where individual color conversion is performed from the color reproduction area 102 of the input device to the color reproduction areas 302_1 and 302_2 of the output devices without using the common color reproduction area 302_0. To solve this problem, there is proposed a technique of performing the color conversion on the L*a*b* space while checking an orientation of the color conversion on the device color space.

It seems at first glance that the problem can be solved by applying the color conversion for checking the orientation of the color conversion on the device color space to the foregoing portion 51 of the color conversion of the method of going through the common color reproduction area 302_0. Unlike the color reproduction areas 302_1 and 302_2 of the output devices, however, the common color reproduction area 302_0 has no device color space associated therewith so that it cannot be applied as-is. Even though the common color reproduction area 302_0 is virtual, it is a matter of course that no adequate color conversion can be obtained by randomly associating the device color spaces with it.

Thus, a description will be given below as to a method of creating the color reproduction definition (color profile) of a virtual output device by assuming the virtual output device having the color reproduction area usable as the common color reproduction area 302_0 for the output device. The virtual output device will be referred to merely as a virtual device hereunder.

The virtual device provides to the medium the color materials in the colors of the amount according to the respective device values of multiple colors (three colors of CMY here). The relation between the device value and the color material amount is decided independently as to each color with no mutual interference.

Figure 8:
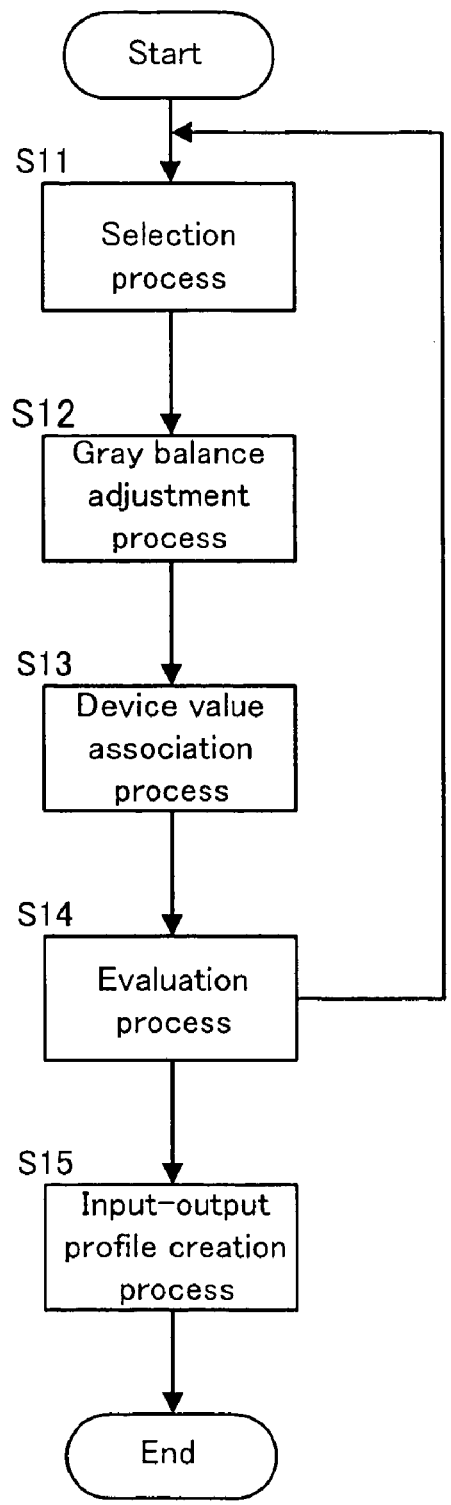
FIG. 8 is a flowchart representing an embodiment of a color reproduction definition creating method of the present invention.

FIG. 8 is a flowchart representing an embodiment of the color reproduction definition creating method of the present invention.

The color reproduction definition creating method has a selection process (step S11), a gray balance adjustment process (step S12), a device value association process (step S13), an evaluation process (step S14) and an input-output profile creation process (step S15).

First, a brief overview of the processes will be described.

The selection process (step S11) is equivalent to an example of the selection step of the present invention, which is the process for selecting what is appropriate as the color material of the virtual device out of various existing color materials.

The gray balance adjustment process (step S12) is equivalent to an example of the gray balance adjustment step of the present invention, which is the process for adjusting the gray balance of the virtual device so as to output an achromatic color when the device values of the colors of CMY are equal.

The device value association process (step S13) is equivalent to an example of the device value association step of the present invention, which is the process for assigning the color material amount corresponding to the device values of 0 to 255 (0% to 100%) as to the colors of CMY.

The evaluation process (step S14) is equivalent to an example of the evaluation step of the present invention, which is the process for evaluating whether or not the color reproduction area of the virtual device is adequate as the common color reproduction area. In the case where the evaluation in the evaluation process is unsatisfactory, it returns to the step S11 to start it all over again from the selection of the color material. In the case where the evaluation is satisfactory, the color profile of the virtual device is completed.

The input-output profile creation process (step S15) is the process for creating the input profile and output profile to be stored in the profile storage section 24 shown in FIG. 5. In this process, the color profile of the virtual device completed up to the step S14 is used to create the input profile and output profile to be used instead of the input profile 41 and output profile 42 described by referring to FIGS. 2 and 3.

Details of the processes will be described hereunder.

Figure 9:
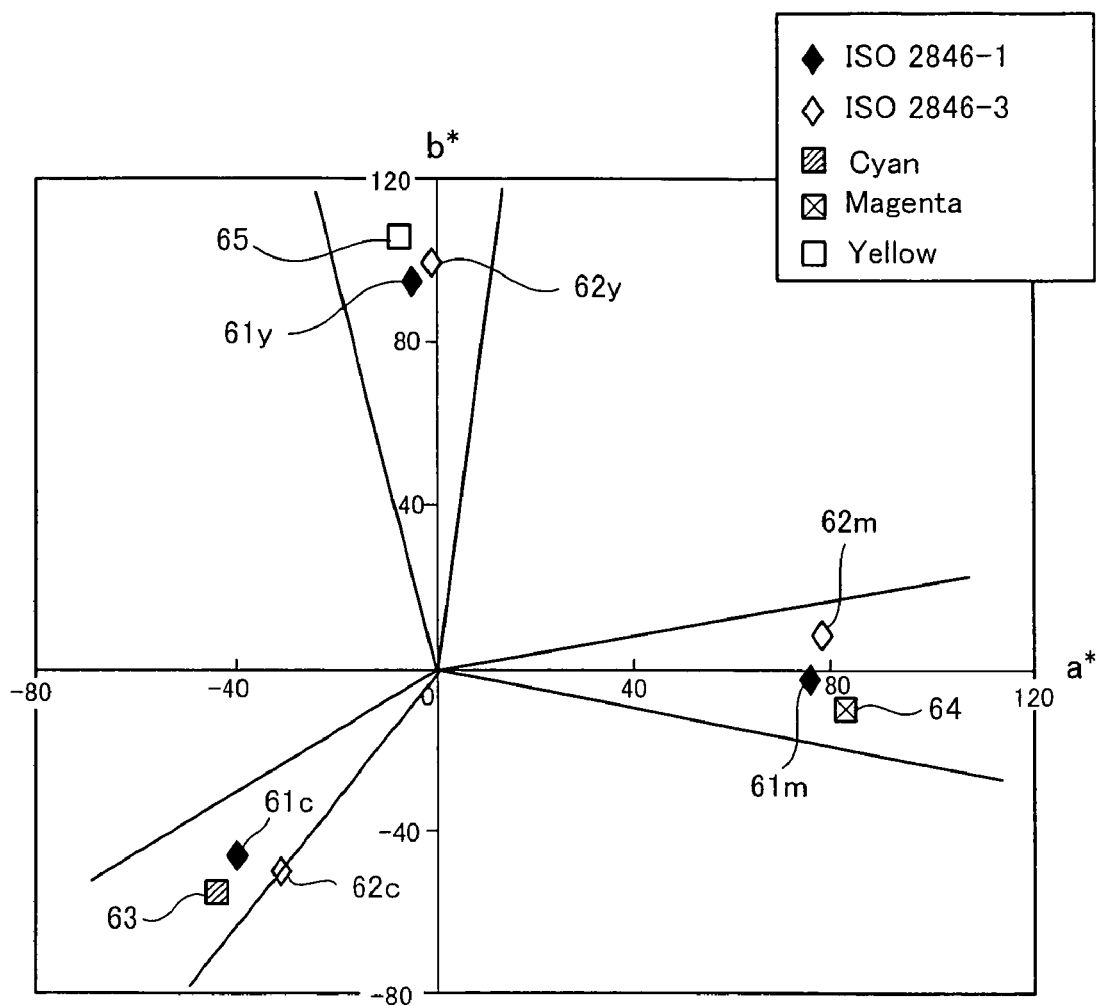
FIG. 9 is a schematic diagram of a selection process.

FIG. 9 is a schematic diagram of the selection process.

A horizontal axis of FIG. 9 represents a value a, and a vertical axis represents a value b.

The graph of FIG. 9 indicates three points 61*c*, 61*m* and 61*y* indicating the values a and b stipulated by ISO as the respective colors of CMY ink for offset printing and three points 62*c*, 62*m* and 62*y* indicating the values a and b stipulated by ISO as the respective colors of CMY ink for gravure printing therein. According to this embodiment, the color material of high saturation existing in a predetermined hue angle range centering on a hue angle in the CMY ink for offset printing is selected. The graph of FIG. 9 also indicates the colors of the color materials thus selected, where a cyan 63 of an inkjet printer, a magenta 64 for six-color printing and a yellow 65 of a printing color proof-specific output device (color proofer) are indicated.

As the color materials selected here are the real color materials, their spectral reflectances are known. If subtractive color mixing according to a Lambert-Beer rule is applied to the spectral reflectance of the color material in each color, a spectral reflectance R (λ) of an output color can be acquired by the following relational expression from spectral reflectances Rc (λ), Rm (λ) and Ry (λ) of the CMY colors, using color material amounts (film thicknesses) c, m and y of the colors and a spectral reflectance Rw (λ) of the medium.

$$R(\lambda)=\{Rc(\lambda)\}^c \times \{Rm(\lambda)\}^m \times \{Ry(\lambda)\}^y \times \{Rw(\lambda)\}$$

Once the spectral reflectance R (λ) of the output color is thus acquired, the Lab value of the output color can be acquired by a predetermined conversion expression.

In the gray balance adjustment process, the color material amount of each color whereby the Lab value of the output color thus acquired becomes the Lab value of a black dot (L, a, b)=(2.79, 0, 0) stipulated by ICC is calculated back by the expressions. And the color material amount of each color is established as the color material amount to be used by the virtual device when the device value of each color is 255 (100%). Thus, the black dot in the color reproduction area of the virtual device matches with the black dot stipulated by ICC. And the achromatic color is outputted from the virtual device when the device values of the colors are equal.

Figure 10:
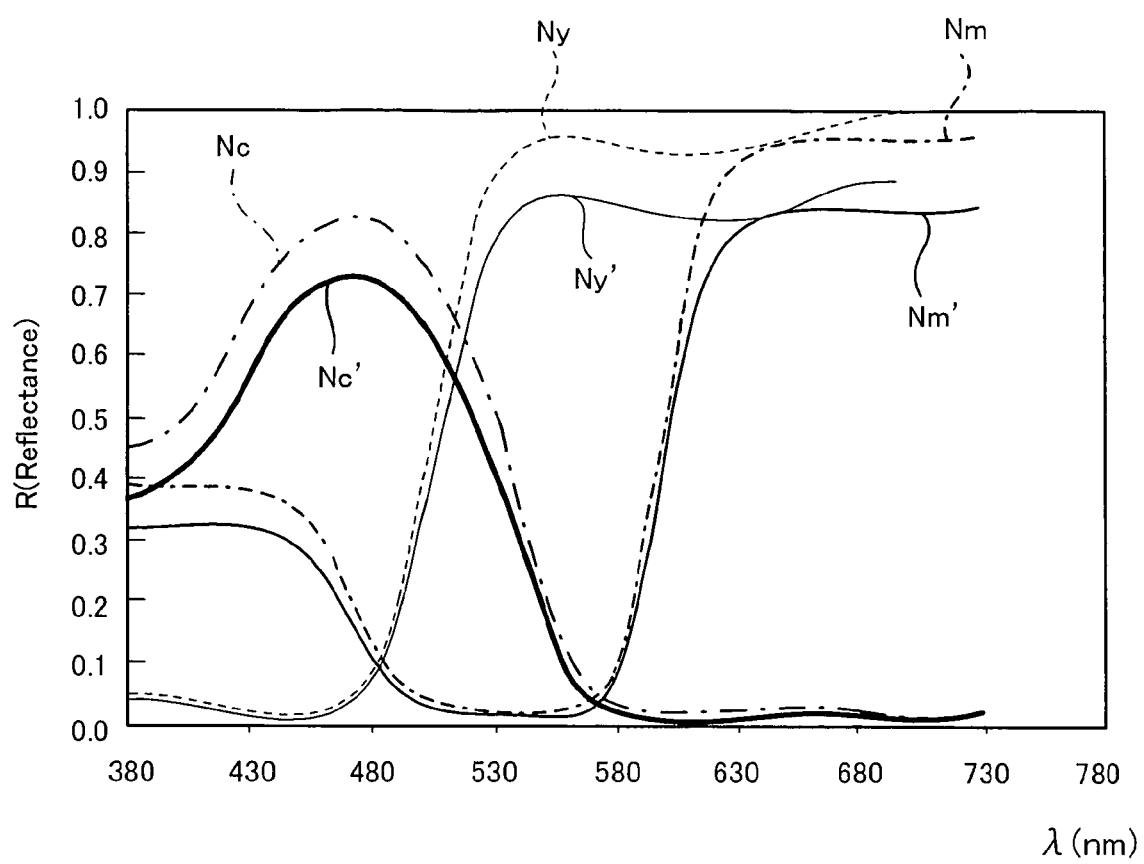
FIG. 10 is a diagram showing an adjustment result of a gray balance adjustment process.

FIG. 10 is a diagram showing a result of the gray balance adjustment process.

The horizontal axis of FIG. 10 represents wavelength λ, and the vertical axis represents spectral reflectance R (λ).

A graph in FIG. 10 shows curves representing the spectral reflectances of the colors CMY, where the three curves in dotted line Nc, Nm and Ny represent the spectral reflectances of the color materials themselves outputted when the device value of each color is 255 (100%). The three curves in full line Nc', Nm' and Ny' represent the spectral reflectances in the case where the color materials having the spectral reflectances represented by the three curves in dotted line Nc, Nm and Ny are provided on a reference medium stipulated by ICC. As for the reference medium, it is stipulated that, irrespective of the wavelength, a reflectance is 89% and the Lab value is (L, a, b)=(95.8, 0, 0).

If the gray balance is thus adjusted, the color material amounts are assigned to the device values of 0 to 255 (0% to 100%) in the device value association process next so that there is a linear relation between the brightness (L value) and the device values when gray having a different brightness is outputted by the virtual device. For instance, in the case of a gray dot of (C, M, Y)=(50%, 50%, 50%), the color material amount capable of acquiring an intermediate L value (2.79+95.8)/2 between the L value "2.79 " of the black dot and the L value "95.8 " of the reference medium is calculated back by using the conversion expression of the spectral reflectance and Lab value and the relational expression of the color material amount and spectral reflectance.

Figure 11:
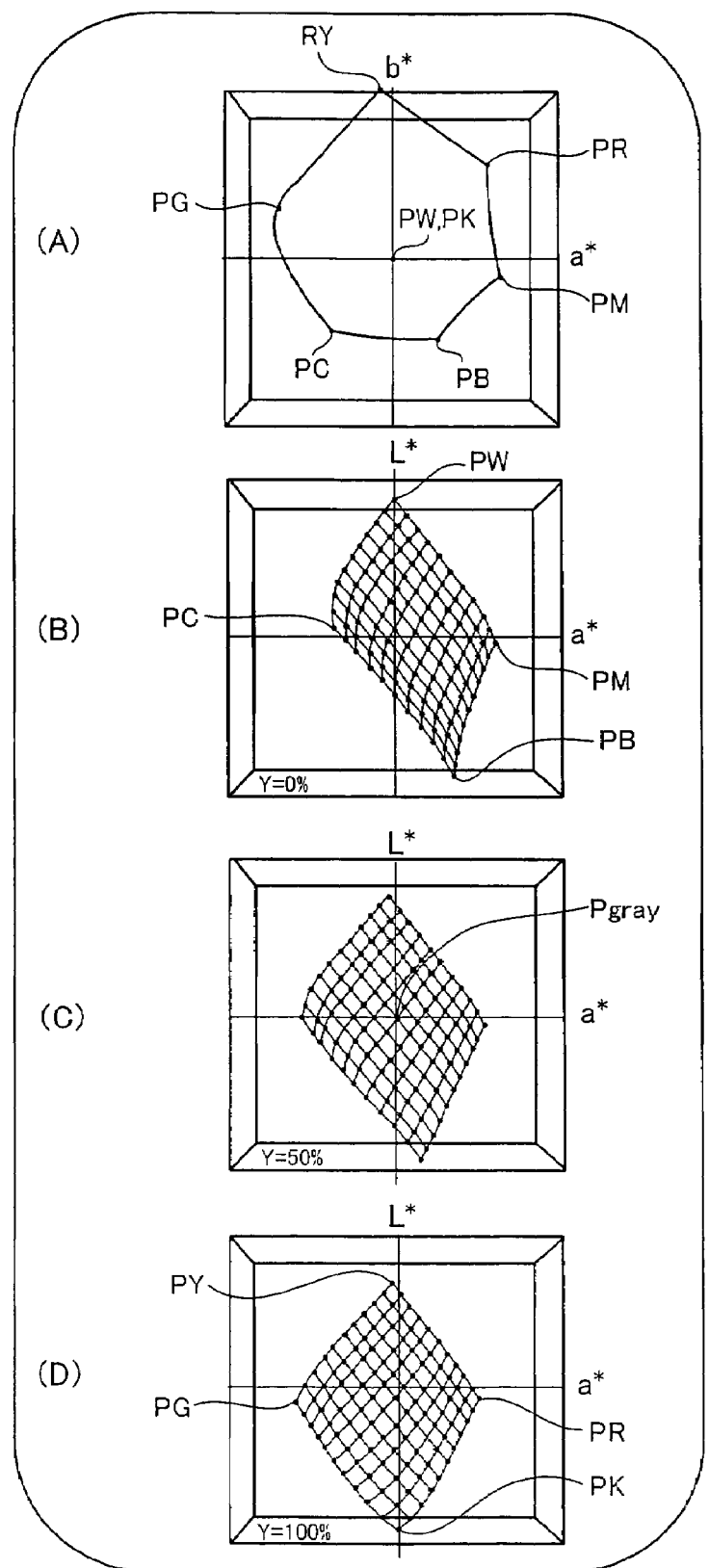
FIG. 11 is a diagram representing the result of a device value association process.

FIG. 11 is a diagram representing the result of the device value association process.

FIG. 11 shows the L*a*b* space. Part (A) of FIG. 11 shows a state of the L*a*b* space viewed from an L-axis direction together with depth in three dimensions. Part (B), part (C) and part (D) of FIG. 11 show a state of the L*a*b* space viewed from a b-axis direction together with the depth in three dimensions.

Part (A) of FIG. 11 shows the color reproduction area of the virtual device using the color material amounts assigned to the device values in the device value association process. This color reproduction area has vertices of a yellow dot PY, a red dot PR, a magenta dot PM, a blue dot PB, a cyan dot PC and a green dot PG. Both a white dot PW and a black dot PK of the color reproduction area exist on the L axis.

Part (B) of FIG. 11 shows a mesh-like state of output colors when the device value of a color Y is 0% and the device values of colors C and M change from 0%, 10%, 20%, . . . , to 100% respectively, where the white dot PW, magenta dot PM, blue dot PB and cyan dot PC are located at four corners of the mesh. The L value of the white dot PW is L=95.8.

Likewise, part (D) of FIG. 11 shows the mesh-like state of the output colors when the device value of the color Y is 100% and the device values of the colors C and M change from 0%, 10%, 20%, . . . , to 100% respectively, where the black dot PK, green dot PG, yellow dot PY and red dot PR are located at the four corners of the mesh. The L value of the black dot PK is L=2.79.

Part (C) of FIG. 11 shows the mesh-like state of the output colors when the device value of the color Y is 50% and the device values of colors C and M change from 0%, 10%, 20%, . . . to 100% respectively, where a gray dot Pgray of (C, M, Y)=(50%, 50%, 50%) is located at the center of the mesh. The gray dot Pgray exists on the L axis as with the white dot PW and black dot PK, and the L value of the gray dot Pgray is L=(95.8+2.79)/2 so that the gray dot Pgray is an intermediate point between the white dot PW and the black dot PK.

Once the color reproduction area is obtained by allocating the color material amounts to the device values, it is evaluated in the evaluation process whether or not the color reproduction area shown in part (A) of FIG. 11 adequately plays a role of the common color reproduction area 302_0 shown in FIG. 7.

Figure 12:
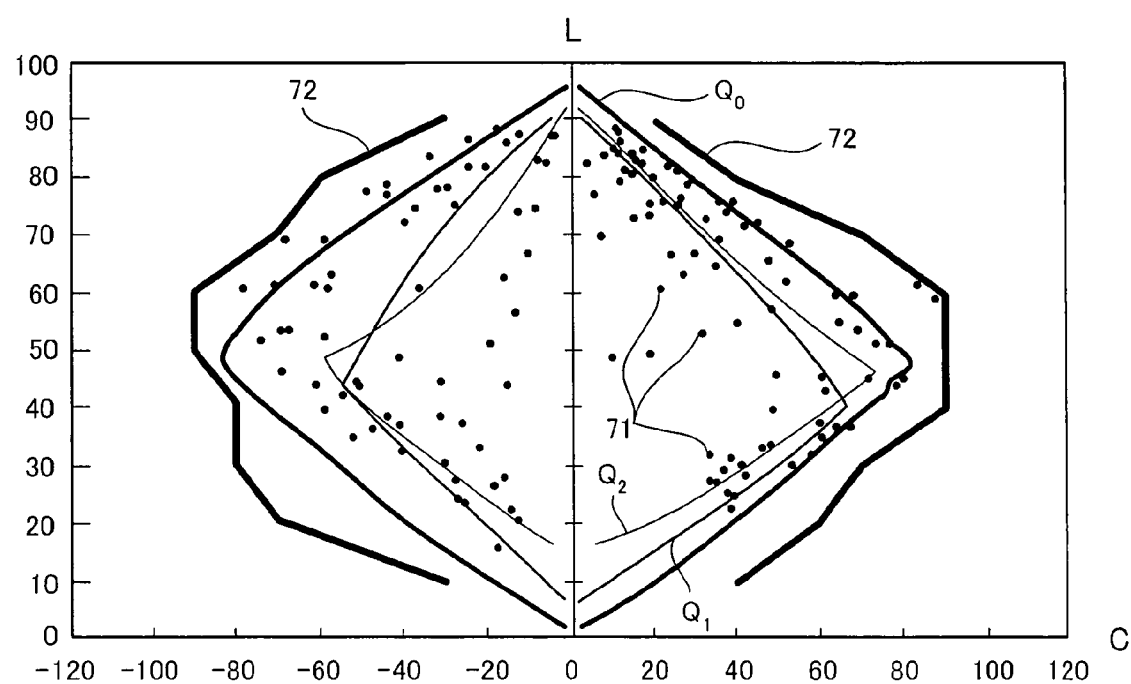
FIG. 12 is a schematic diagram of an evaluation process.

FIG. 12 is a schematic diagram of the evaluation process.

This embodiment uses an LCH space in the evaluation process.

The horizontal axis of FIG. 12 represents the C value, and the vertical axis represents the L value. FIG. 12 shows the range of H=0 degree±11.25 degrees, 180 degrees±11.25 degrees of the LCH space.

FIG. 12 also shows a color reproduction area $Q_0$ having the color reproduction area of the virtual device mapped on the LCH space and color reproduction areas $Q_1$ and $Q_2$ having the color reproduction areas 302_1 and 302_2 shown in FIG. 7 mapped on the LCH space. The color reproduction area $Q_0$ of the virtual device includes the color reproduction areas $Q_1$ and $Q_2$ of a real output device so as to meet a requirement as the common color reproduction area. Next, inclusion rates for various real object colors are acquired as a sufficient condition. As it is ideal but impossible to use an object color group covering all the real object colors as a standard, this embodiment uses PANTONE spot colors (1,113 colors) and a color group (1,009 colors) prescribed by ISO12640-3 as realistic substitutes for the object color group. Spot color points 71 on the graph represent the spot colors included in the PANTONE spot colors, and a border line 72 in the graph represents an outer border of the range of the color group prescribed by ISO12640-3. Within the range of the color group prescribed by ISO12640-3, standard colors for evaluation are placed at lattice-like dots at every ten points as to each of the C value and L value. The border line 72 is prescribed as to each of sixteen orientations lined up at 22.5-degree intervals from H=0 degree. As for each of the 1,113 colors of the PANTONE spot colors and 1,009 colors of ISO12640-3, the inclusion rate by which the color reproduction area $Q_0$ of the virtual device includes these colors is calculated. If the inclusion rate is high enough, the color reproduction definition of the virtual device is completed. In the case where the inclusion rate is not high enough due to a poor form of the color reproduction area $Q_0$ for instance, it is started all over again form the selection of the color materials as described above.

According to this embodiment, the color reproduction definition of the virtual device thus completed is used, and as will be described below, the gamut mapping is incorporated in the input profile 41 and output profile 42 described by referring to FIGS. 2 and 3.

Figure 13:
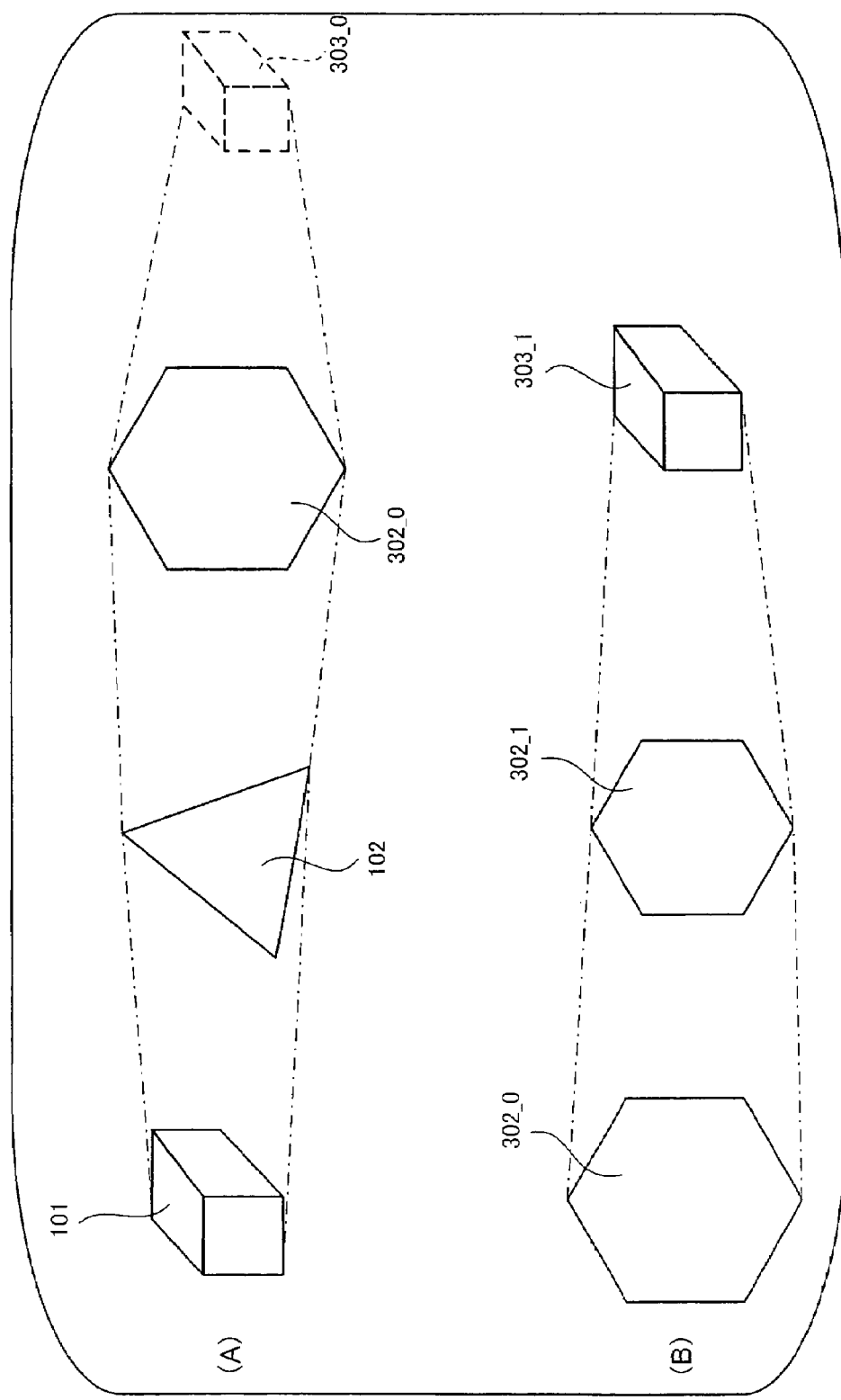
FIG. 13 is a schematic diagram of input-output profile creation process.

FIG. 13 is a schematic diagram of the input-output profile creation process.

Part (A) of FIG. 13 shows the conceptual diagram of the input profile, and part (B) of FIG. 13 shows the conceptual diagram of the output profile.

As shown in part (A) of FIG. 13, the input profile defines a conversion relation between the color reproduction area 101 of the RGB space of the input device and the common color reproduction area 302_0 using the color reproduction area on the L*a*b* space of the virtual device.

The foregoing portion of the input profile is the conversion between the color reproduction area 101 on the RGB space of the input device and the color reproduction area 102 on the L*a*b* space. This portion is the very conversion defined by the input profile 41 shown in FIG. 2. This conversion is equivalent to a first color representation conversion according to the present invention.

The subsequent portion is the gamut mapping between the color reproduction area 102 on the L*a*b* space of the input device and the common color reproduction area 302_0. The gamut mapping uses the color reproduction definition defining the correspondence between the common color reproduction area 302_0 and a device color space 303_0 of the virtual device, which is obtained by the technique described in the Japanese Patent Laid-Open No. 2001-103329. This conversion is equivalent to a first color area conversion according to the present invention.

The input profile has a final correspondence between the RGB values and the Lab values associated by such color conversion through the foregoing portion and subsequent portion defined in the LUT form. The input profile thus created is equivalent to a first combined transformation definition according to the present invention.

As shown in part (B) of FIG. 13, the output profile defines the conversion relation between the common color reproduction area 302_0 and a color reproduction area 303_1 of the CMY space of the output device.

The subsequent portion of the output profile is the conversion between the color reproduction area 302_1 on the L*a*b* space of the output device and the color reproduction area 303_1 on the CMY space. This portion is the very conversion defined by the output profile 42 shown in FIG. 3. This conversion is equivalent to a second color representation conversion according to the present invention.

The foregoing portion is the conversion between the common color reproduction area 302_0 and the color reproduction area 302_1 on the L*a*b* space of the output device, which can be obtained by arbitrary gamut mapping on the L*a*b* space conventionally proposed. This conversion is equivalent to a second color area conversion according to the present invention.

The output profile also has the final correspondence between the Lab values and the CMY values associated by the color conversion through the foregoing portion and subsequent portion defined in the LUT form. The output profile thus created is equivalent to a second combined transformation definition according to the present invention.

The input profile and output profile thus created are stored in the profile storage section 24 shown in FIG. 5 so that an embodiment of the color conversion method according to the present invention is performed on the personal computer 20 shown in FIG. 1.

Figure 14:
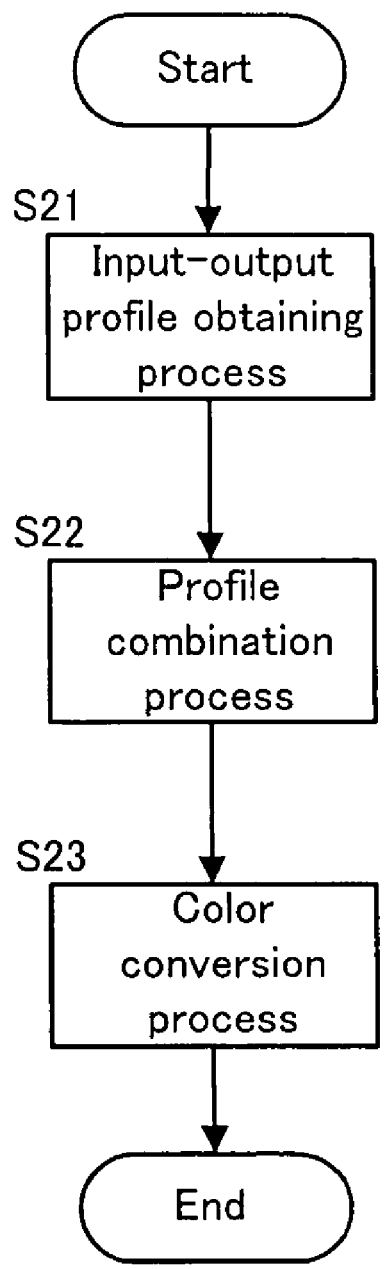
FIG. 14 is a flowchart showing an embodiment of the color conversion method according to the present invention.

FIG. 14 is a flowchart showing an embodiment of the color conversion method according to the present invention.

The color conversion method has an input-output profile obtaining process (step S21), a profile combination process (step S22) and a color conversion process (step S23).

The input-output profile obtaining process is the process for obtaining the input profile and output profile as shown in FIG. 13.

The profile combination process is the process for combining the obtained input profile and output profile via the common color reproduction area to create the color conversion definition. It thereby defines the color conversion having the first color representation conversion, first color area conversion, second color area conversion and second color representation conversion of the present invention combined.

Lastly, the color conversion process is the process for performing the color conversion following the color conversion definition thus combined.

Thus, according to the color conversion method of the present embodiment, the input profile and output profile incorporating suitable gamut mapping are used so that it is possible, without performing a complicated operation, to easily implement the color conversion for maintaining continuity of the tones and having the impressions matching up mutually among the multiple output devices.

According to the color conversion method of the present invention, it is not essential to use the input profile and output profile incorporating the gamut mapping. It is also possible to perform the operation of the gamut mapping with a predetermined algorithm each time the color conversion is performed.

The description exemplifies creation of the color reproduction definition of the virtual device using the three colors of CMY. However, the color reproduction definition creating method of the present invention may also be applied to the creation of the color reproduction definition of the virtual device using the four colors of CMYK or six colors of CMYK, green and orange.

What is claimed is:

1. A color reproduction definition creating method that creates a color reproduction definition representing a correspondence between a device value and an output color of a hypothetical virtual device outputting an image on a medium with a color material of each color according to the device value of each of a plurality of colors, the method comprising:

a selection step of selecting candidates of color materials in a plurality of colors to be used on the virtual device from real color materials;

a gray balance adjustment step of associating a color material amount of each color with a maximum value of the device value of each color when the virtual device outputs a predetermined black color by using the color materials in the plurality of colors selected in the selection step;

a device value association step of associating each color material amount with each device value so that a relation between brightness and the device value becomes a linear relation when the virtual device outputs achromatic colors of different brightness; and an evaluation step of evaluating broadness of a color range reproducible by the virtual device by an inclusion rate of a plurality of standard colors, and having the steps started all over again from the selection step according to an evaluation result, wherein evaluating includes:

mapping the common color reproduction area in LCH space, mapping selected spot color points comprising standard colors on the mapped common color reproduction area, and determining the inclusion rate based on the mapped spot color points included within the mapped common color reproduction area, wherein at least one of the selection step, gray balance adjustment step, device value association step, and evaluation step is performed by a computer.

2. The method according to claim 1, wherein the inclusion rate is determined relative to spot colors associated with at least one of Pantone and 15012640-3.

3. The method according to claim 1, wherein the hypothetical virtual device has a common color reproduction area which includes entire color reproduction areas of a plurality of devices.

4. A color reproduction definition creating method that creates a color reproduction definition representing a correspondence between a device value and an output color of a hypothetical virtual device outputting an image on a medium with a color material of each color according to the device value of each of a plurality of colors, the method comprising:
 a selection step of selecting candidates of color materials in a plurality of colors to be used on the hypothetical virtual device from real color materials;
 a gray balance adjustment step of associating a color material amount of each color with a maximum value of the device value of each color when the hypothetical virtual device outputs a predetermined black color by using the color materials in the plurality of colors selected in the selection step, wherein the hypothetical virtual device has a common color reproduction area which includes entire color reproduction areas of a plurality of devices;
 a device value association step of associating each color material amount with each device value so that a relation between brightness and the device value becomes a linear relation when the virtual device outputs achromatic colors of different brightness; and
 an evaluation step of evaluating broadness of a color range reproducible by the virtual device by an inclusion rate of a plurality of standard colors, and having the steps started all over again from the selection step according to an evaluation result, wherein the selection step comprises:
  selecting the candidates color materials from real color materials of the devices, and
  assigning the selected candidate color candidates to be the colors of the hypothetical virtual output device based on the inclusion rate, wherein at least one of the selection step, gray balance adjustment step, device value association step, and evaluation step is preformed by a computer.

5. A color reproduction definition creating method that creates a color reproduction definition representing a correspondence between a device value and an output color of a hypothetical virtual device outputting an image on a medium with a color material of each color according to the device value of each of a plurality of colors, the method comprising:
 a selection step of selecting candidates of color materials in a plurality of colors to be used on the hypothetical virtual device from real color materials;
 a gray balance adjustment step of associating a color material amount of each color with a maximum value of the device value of each color when the hypothetical virtual device outputs a predetermined black color by using the color materials in the plurality of colors selected in the selection step;
 a device value association step of associating each color material amount with each device value so that a relation between brightness and the device value becomes a linear relation when the hypothetical virtual device outputs achromatic colors of different brightness; and
 an evaluation step of evaluating broadness of a color range reproducible by the virtual device by an inclusion rate of a plurality of standard colors, and having the steps started all over again from the selection step according to an evaluation result, wherein the gray balance adjustment step comprises:
  adjusting gray balance of the virtual device by establishing the color material amount of each color to be used by the virtual device when the device value of each color is equal to 255, wherein at least one of the selection step, gray balance adjustment step, device value association step, and evaluation step is preformed by a computer.

6. The method according to claim 5, wherein the device value association step comprises:
 assigning the color material amounts to the device values of 0 to 255 to form the linear relation between the brightness and the device values, based on the adjusted gray balance of the virtual device.

* * * * *